United States Patent
Bazinet et al.

(10) Patent No.: US 7,266,733 B2
(45) Date of Patent: Sep. 4, 2007

(54) METHOD FOR APPLICATION EVENT INTEGRATION

(75) Inventors: Allan Arthur Loring Bazinet, Colchester, VT (US); Rhonda L. Childress, Austin, TX (US); Paul Fearn, Raleigh, NC (US); Richard Joseph Sheftic, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 10/171,945

(22) Filed: Jun. 13, 2002

(65) Prior Publication Data

US 2003/0233435 A1    Dec. 18, 2003

(51) Int. Cl.
*G06F 11/00* (2006.01)
*G06F 15/173* (2006.01)
*G06F 9/44* (2006.01)
*G06F 3/00* (2006.01)

(52) U.S. Cl. .................. 714/45; 709/224; 717/127

(58) Field of Classification Search ............ 709/223, 709/224; 714/39, 48, 701, 38, 45; 717/124, 717/125–131; 719/318
See application file for complete search history.

(56) References Cited

U.S. PATENT DOCUMENTS

| 5,594,889 | A  |   | 1/1997 | Colgate et al. ........ 395/497.02 |
|-----------|----|---|--------|-----------------------------------|
| 5,740,354 | A  | * | 4/1998 | Ben-Natan et al. ........... 714/45 |
| 5,790,779 | A  | * | 8/1998 | Ben-Natan et al. ........... 714/39 |
| 6,021,262 | A  | * | 2/2000 | Cote et al. .................... 714/48 |
| 6,070,072 | A  | * | 5/2000 | Dorenbosch et al. ....... 455/423 |
| 6,094,195 | A  |   | 7/2000 | Clark et al. ................. 345/349 |
| 6,169,979 | B1 |   | 1/2001 | Johnson ..................... 705/412 |
| 6,697,970 | B1 | * | 2/2004 | Chisholm ................... 714/48 |
| 6,772,376 | B1 | * | 8/2004 | Merkin et al. ............... 714/48 |
| 2004/0107387 | A1 | * | 6/2004 | Larsson et al. .............. 714/39 |

OTHER PUBLICATIONS

Gulcu, Ceki. "Log4j devlivers control over logging." JavaWorld. Nov. 2000. <http://www.javaworld.com/jw-11-2000/jw-1122-log4j.html>.*

* cited by examiner

*Primary Examiner*—Andrew Caldwell
*Assistant Examiner*—Philip J. Chea
(74) *Attorney, Agent, or Firm*—Duke W. Yee; David A. Mims, Jr.; Theodore D. Fay, III

(57) ABSTRACT

A method, program and system for application event notification are provided. The invention comprises, responsive to detection of an error within an application, sending error data from the application to an event logger facility, which formats the error data according to requirements of target destinations. The event logger facility send the error data to a support service, which may use the error message as a lookup key into a log file containing application state data.

17 Claims, 4 Drawing Sheets

METHOD FOR APPLICATION EVENT INTEGRATION

BACKGROUND OF THE INVENTION

1. Technical Field

The present invention related generally to computer software, and more specifically to trouble shooting and support for application problems.

2. Description of Related Art

In current environments, the tasks of detecting application problems and notifying proper support services often fall to the application end-user.

In the event that a problem occurs with the application in question, the end user who is using the application must call the business help desk to report a problem with the application. Often this notification is made significantly later in time from when the problem first occurs. The business help desk then contacts the relevant operational support team, who then notify a specific application support team that will access the relevant log files to diagnose the problem.

Therefore, it would be desirable to have a method for automating problem detection and notification, thus reducing the time to detect and respond to problems arising in an executing application requiring high availability.

SUMMRY OF THE INVENTION

The present invention comprises a method, program and system for application event notification. The invention comprises, responsive to detection of an error within an application, sending error data from the application to an event logger facility, which formats the error data according to requirements of target destinations. The event logger facility send the error data to a support service, which may use the error message as a lookup key into a log file containing application state data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method for reducing the time needed to detect and respond to one or more problem conditions within an application program executing in a business environment requiring high availability of the program function.

Figure 1:
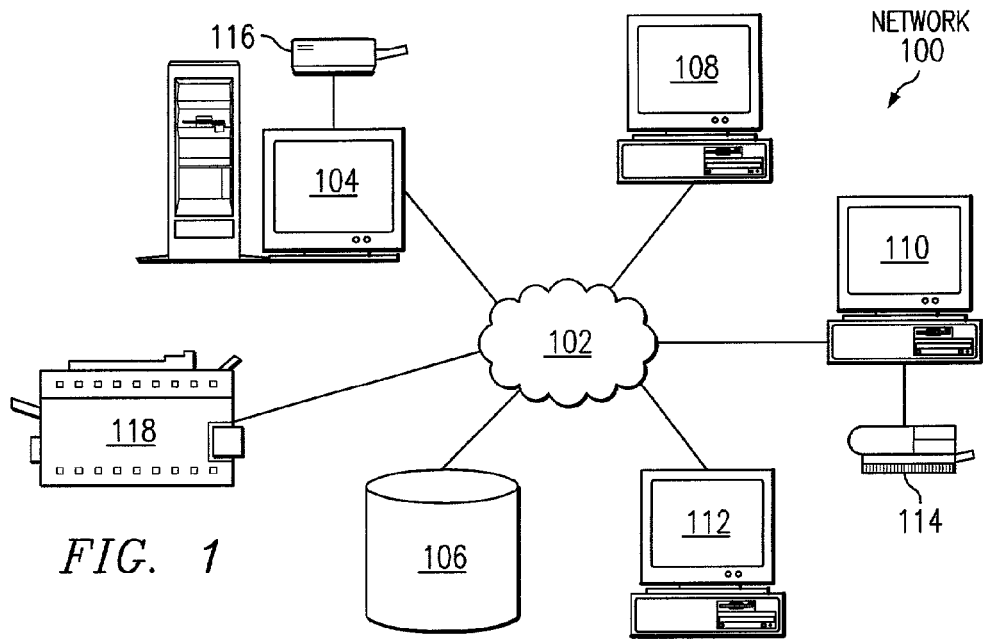
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
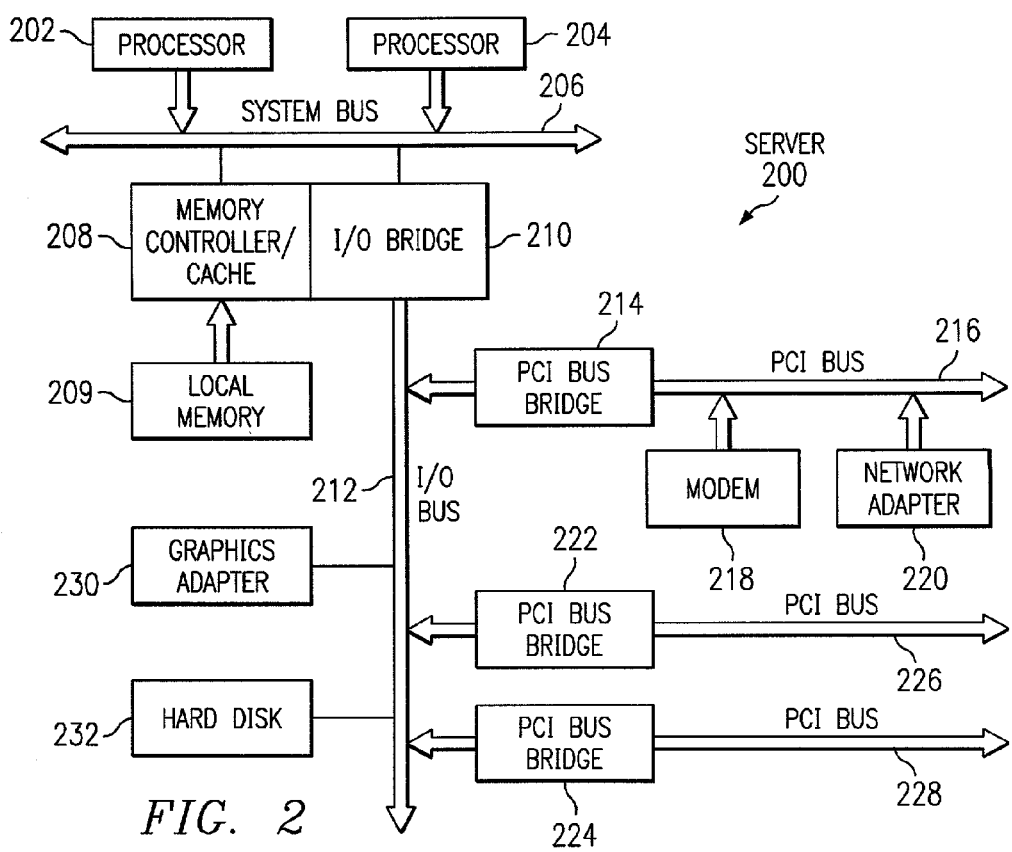
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported.

In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N. Y., running the Advanced Interactive Executive (AIX) or Linux operating systems.

Figure 3:
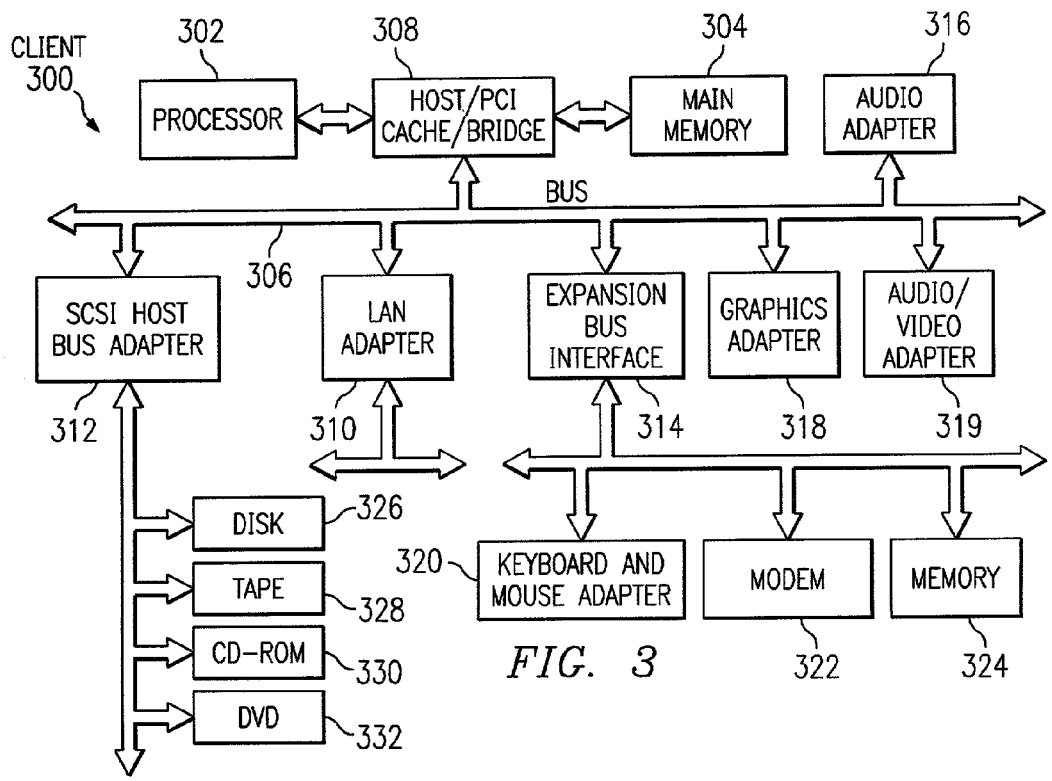
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
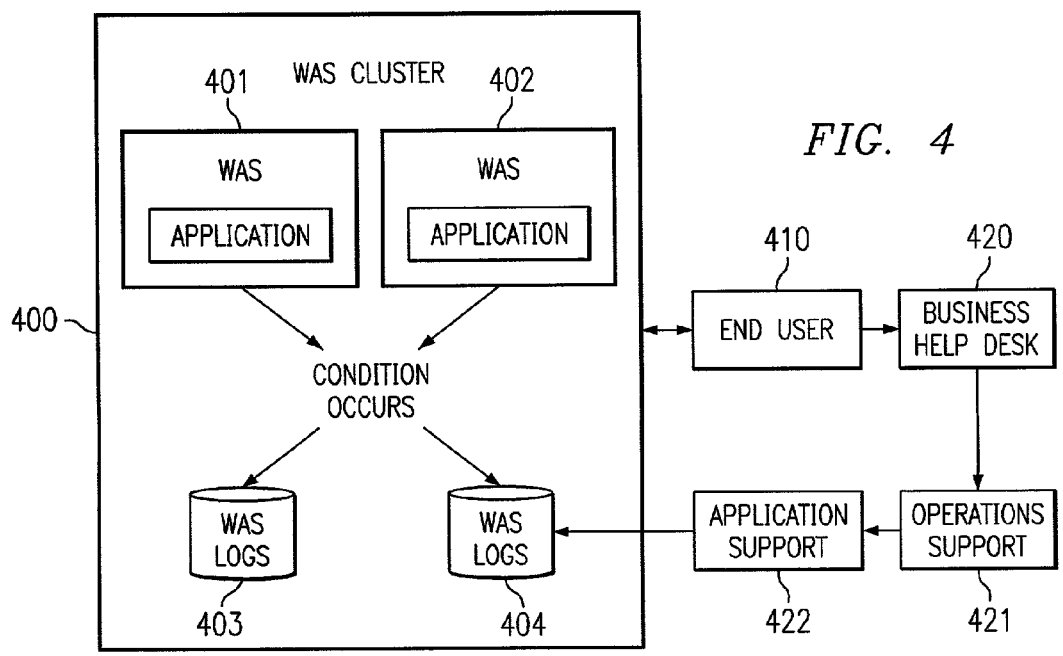
FIG. 4 depicts a diagram illustrating an architecture for manual error detection and notification in accordance with the prior art.

Referring to FIG. 4, a diagram illustrating an architecture for manual error detection and notification is depicted in accordance with the prior art. This process involves the end user having to perform most of the problem detection and notification. In the present example, the Web Application Server (WAS) cluster 400 comprises two web application servers 401 and 402, each running the same application. WAS logs 403 and 404, at the programmers option, record data about the condition of the application's operation. However, until alerted through some external manual means, there is no way for application support personnel to know when to look at the log files and where specifically in the log file to look for relevant problem information.

In the event that a problem occurs with the web application in question, the end user 410 who is using the application must call the business help desk 420 to report a problem with the application. Often this notification is made significantly later in time from when the problem first occurs. The business help desk 420 then contacts the relevant operational support team 421, who then notify a specific application support team 422 that will access the relevant log files in WAS logs 403 and 404 to diagnose the problem.

Figure 5:
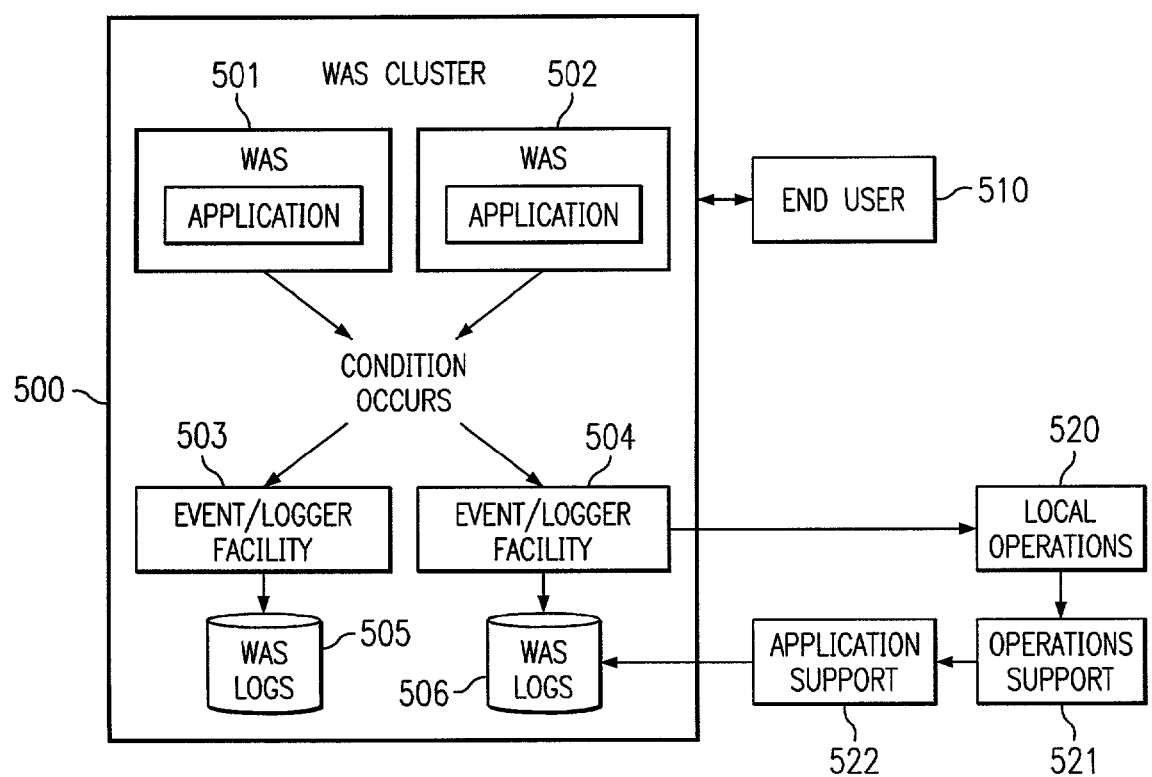
FIG. 5 depicts a diagram illustrating the architecture for automated error detection and notification in accordance with the present invention.

Referring to FIG. 5, a diagram illustrating the architecture for automated error detection and notification is depicted in accordance with the present invention. Similar to FIG. 4, the present invention can be implemented in a WAS cluster 500 comprising web application servers 501 and 502 running the same application. However, with the implementation of the present invention, the application itself detects the problem and externalizes application state information to Event/Logger Facilities (ELFs) 503 and 504. The ELFs 503 and 504 format the data and sends an error message to the local support operations 520 with the details pertaining to the problem that has occurred. The ELFs also record operational data on the WAS logs 505 and 506. The operational support teams 521 notify the relevant application support team 522, who use the error message data to perform a lookup in the WAS logs 505 and 506 in order to quantify and resolve the problem.

This service comprises a single, generic (notification mechanism independent), real time interface to the ELF that handles notification of the application state information to a highly configurable set of targets of the application state information. Examples of notification mechanisms that can be supported concurrently and consistently with the invention include real time event generation and delivery to an event management system, logging of the same application program state information to one or more log files, and/or interfacing to external applications.

Through the use of the event/logger facility, an application program will make a single call sequence to the predefined generic event/logger service interface when the application needs to externalize specific critical state information. As depicted in FIG. 5, depending on the event/logger facility configuration, the application state information could be concurrently sent to an event management system and one or more log files. The key point is that one or more concurrent notifications can be initiated by the application by making one sequence of service calls, and the information conveyed to each notification mechanism will consist of the same data components. Thus, the content of the event message sent to the event management system console will serve as a locator key into the appropriate application log file to facilitate rapid location of the corresponding message in a log file. This in turn serves as a locator for other relevant log messages that can provide additional context to the condition that caused the application to generate the alert.

The variable parameters or class of objects are defined to include the appropriate information from the application, such that any event facility can then utilize them transparently to the application. This allows the application program to communicate to any event management system (or other notification mechanism) without changes to the application beyond the initial coding of the call to the ELF.

The ELF is configured such that the application code call does not require the details regarding the various notification mechanisms, thereby providing a flexible solution customizable at runtime. The facility is dynamically called at runtime, and can be customized to provide many different mechanisms for alerting, e.g., logging, paging, email and events. Thus, the dynamic configuration of the ELF at runtime allows for the addition, deletion, and modification of operational characteristics of event handlers and appenders.

The present invention provides timely, automatic notification of the appropriate support and also provides the support staff with the necessary contextual information to enable more efficient and expedient problem determination.

The ELF is a generic service interface that includes the best practices information as defined by Event Management Subject Matter Experts (SMEs). By using this generic call, the event management team can implement an event handler to take the information from the application program and process it appropriately.

Figure 6:
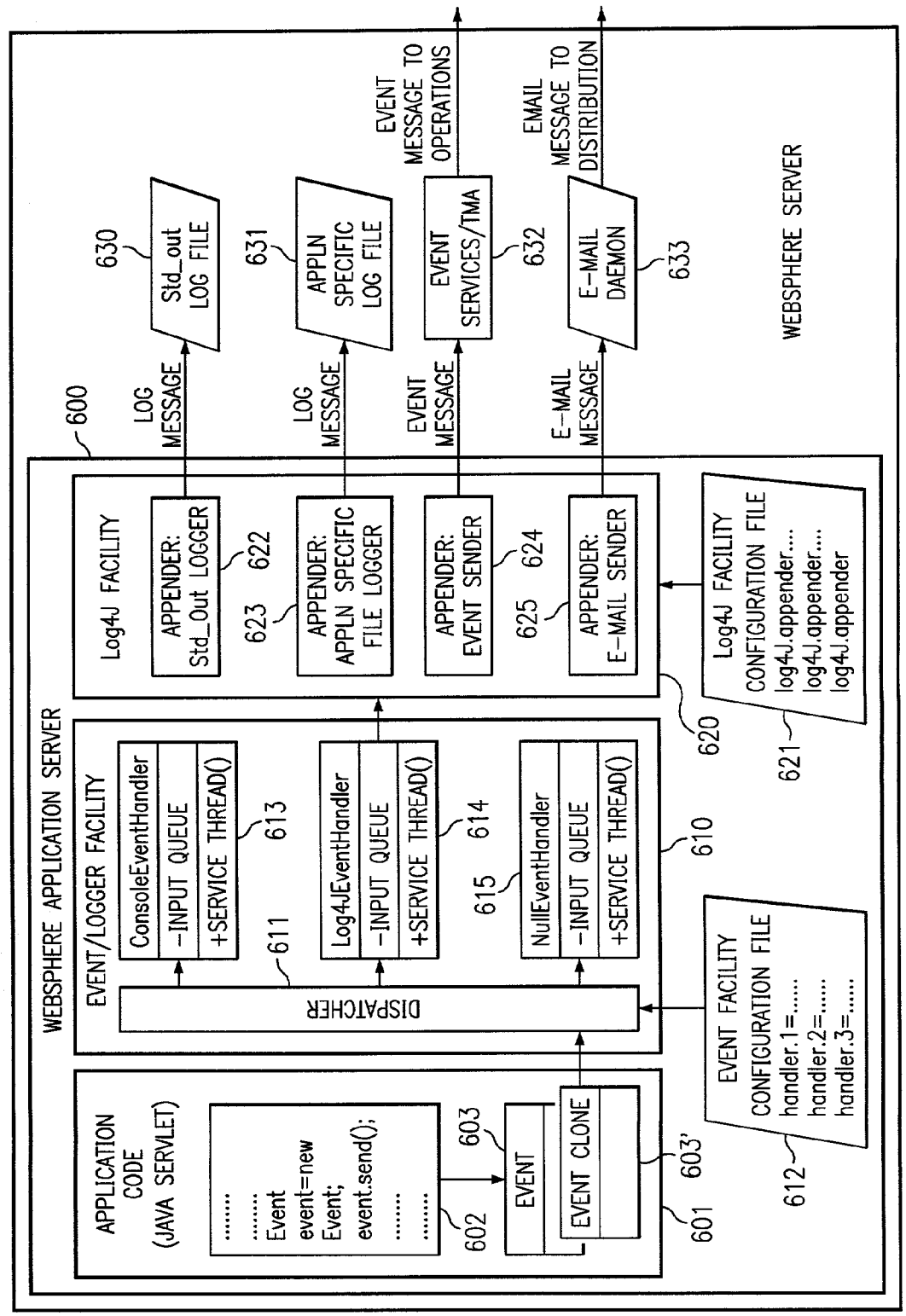
FIG. 6 depicts a diagram illustrating the event facility internal flow sequence in accordance with the present invention.

Referring to FIG. 6, a diagram illustrating the event facility internal flow sequence is depicted in accordance with the present invention. The application program 601 (e.g., Java servlet) instantiates an Event object 603 and invokes the Event object Send method 602 to request that one or more external notifications be made on behalf of the application program based on the parameters settings in the configuration files. The Event object 603 contains the notification message data elements.

The Event object 603 creates a clone of itself 603' and provides the clone 603' to the Dispatcher 611 component of the ELF 610.

If the ELF 610 is already initialized and running, the Dispatcher component 611 receives the Event object clone 603'.

If the ELF 610 has not previously been provided an Event object (first use since restart), the ELF 610 initializes itself. As part of its initialization, the ELF 610 reads the Event Facility Configuration file 612 and starts the Event handlers 613, 614 and 615 defined in the configuration file 612. The Event handlers 613-615 subscribe themselves to the Dispatcher component 611.

Upon input of the Event object clone 603' onto the Event handler queues, each Event handler 613-615 formats the Event object clone 603' into whatever format the target destination requires. For example, in the case of the Console Event Handler 613, the Event object clone 603' is converted to a string. In the case of the Log4J Event Handler 614, the Event object clone 603' is converted to a Log4J object. The Null Event Handler 615 is a special case Event handler that serves as a debug and test destination for the Event object clone 603'; no further processing is performed by the Null Event Handler 615.

The various Event handlers 613-615 pass the appropriate converted Event objects to the corresponding Log4J appenders 622-625. Log4J is an open source Java logging facility that provides the application programmer a means to control which log statements are output with run time configurable granularity through the use of an external configuration file. If a given Log4J appender has not previously been used since system restart, the Log4J Facility 620 initializes that appender based on the parameter settings in the Log4J Configuration file 621.

The various Log4J appenders 622-625 perform any additional processing and formatting of the Event object data elements required by the message type and target destination.

The notification message is delivered to the target destinations 630-633 corresponding to the message type. Because the alert notification message contains the exact same information as the log message written to the log file on the application server, the Event Console message serves as a lookup key into the application server log file. This allows application support personnel to pin point the relevant area in a potentially large and complex application server log file.

A critical set of notification message elements has been identified by SMEs to reflect a balance between information required to pinpoint an application problem and reasonable message size. The data elements comprising the notification message include:

Application Component ID: major functional area of the application; identifies the problem (event message source) location within the application.

Application Subcomponent ID: functional area within a specific Application Component and is used in conjunction with the Application Component ID to identify the problem location within the application.

Event Message ID

Event Message Text

Priority: priority according to specified acceptable values.

Application Name: name of application specified in the event facility configuration file.

Date/Time: date and time the event message is sent.

Hostname: name of the server where the application send the event message is executing.

Log File ID: identifies what log file(s) the message is logged to if logging is enabled.

Previously, the mechanism to externalize application program status information to an event management system is accomplished through one of two general methods. The first is for the application program to log information to a log file and configure the event management system to interrogate the file for error related information at predefined intervals. However, this does not provide real time information, and becomes very complex to administer as the number of log files increases. In addition, this approach has the potential to consume a large amount of computing resources to scan the log file and find relevant information as the rate and volume of logged information increases.

The second method is to place within the application program a specific service call to the appropriate systems management system in order to send the event information. Each event management system has system specific application event service calls and parameters. Typically, the various event management systems require very similar information. However, the name of the call, the position of the parameter, etc., differ depending on the event management system. An application program utilizing this event mechanism would necessarily contain unique code to make the event service calls correspond to the specific event management system in use. This makes the application code susceptible to coding changes due to event management system technology and/or product evolution.

Furthermore, with the two methods described above, there is no inherent linkage between the application problem information being logged and the application problem event. This means that separate code would be required to log appropriate application problem information and to send an event to the management system, and there is no way for the receiver of the event information to associate the specific event with an application log message.

The present invention improves on these previous methods in three important ways. The first, as described above, is by providing a generic notification service interface to the application program that enables multiple concurrent, consistent notifications to be made to multiple application support constituencies, based on a single set of parameters and service call sequence.

The second improvement is isolating the application program from technical implementation details of the event/logger facility, thereby protecting the application program from code changes due to the technical evolution of supporting notification mechanisms configured as part of the event logger facility.

The third improvement is facilitating a reduction in the time to detect and respond to a run time problem condition identified within an application by alerting application support personnel to the occurrence of the problem in real time and by conveying the necessary data elements required to efficiently pin point the location of the problem within the application program as part of all the notifications made by the event/logger facility.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for application event notification, the method comprising the computer-implemented steps of:

responsive to detection of an error within an application, sending error data from the application to an event logger facility, wherein the event logger facility is configured to format the error data into a plurality of formats, wherein each of the plurality of formats is different, and wherein the each of the plurality of formats is adapted for use with a different target destination and wherein the event logger facility is dynamically configured based on the event facility configuration file; and sending the error data from the event logger facility to a support service.

2. The method according to claim 1, wherein the application error is detected by the application itself.

3. The method according to claim 1, further comprising:

sending the error data from the event logger facility to a log file.

4. The method according to claim 3, wherein the error data sent to the support service serves as a lookup key into the log file.

5. The method according to claim 1, wherein dynamically configuring the event logger facility is performed at run time to allow addition, deletion, and modification of operational characteristics.

6. The method according to claim 1, wherein the application uses a single, generic, real time interface to the event logger facility.

7. A computer program product in a tangible computer readable medium for use in a data processing system, for application event notification, the computer program product comprising:

first instructions, responsive to detection of an error within an application, for sending error data from the application to an event logger facility, wherein the event logger facility may format the error data into a plurality of formats, wherein each of the plurality of formats is different, and wherein each of the plurality of formats is adapted for use with a different target destination and wherein the event logger facility is dynamically configured based on the event facility configuration file; and second instructions for sending the error data from the event logger facility to a support service.

8. The computer program product according to claim 7, further comprising:

third instructions for sending the error data from the event logger facility to a log file.

9. The computer program product according to claim 8, wherein the error data sent to the support service serves as a lookup key into the log file.

10. The computer program product according to claim 7, further comprising fourth instructions for dynamically configuring the event logger facility at run time to allow addition, deletion, and modification of operational characteristics.

11. The computer program product according to claim 7, wherein the application uses a single, generic, real time interface to send error data to the event logger facility.

12. A system for application event notification, the system comprising:
   an interface for externalizing error data from an application;
   an event logger facility that may format the error data into a plurality of formats, wherein each of the plurality of formats is different, and wherein each of the plurality of formats is adapted for use with a different target destination and wherein the event lover facility is dynamically configured based on the event facility configuration file; and
   a communication component for sending the error data from the event logger facility to a support service.

13. The system according to claim 12, wherein application errors are detected by the application itself.

14. The system according to claim 12, further comprising:
   a second communication component for sending the error data from the event logger facility to a log file.

15. The system according to claim 14, wherein the error data sent to the support service serves as a lookup key into the log file.

16. The system according to claim 14, further comprising a configuration component for dynamically configuring the event logger facility at run time to allow addition, deletion, and modification of operational characteristics.

17. The system according to claim 14, wherein the interface for externalizing application error data is a generic, real time interface.

* * * * *